June 19, 1956 H. KORBER 2,751,230
HYDRAULIC CHUCK
Filed Nov. 18, 1950 4 Sheets-Sheet 1
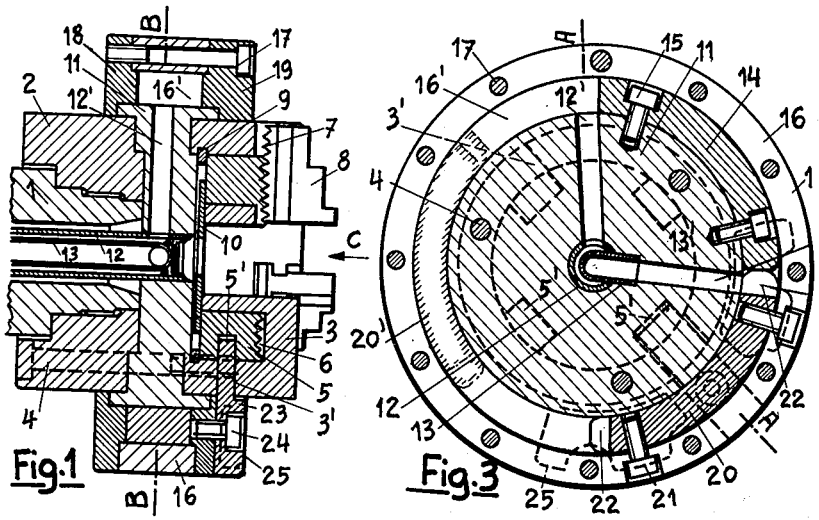
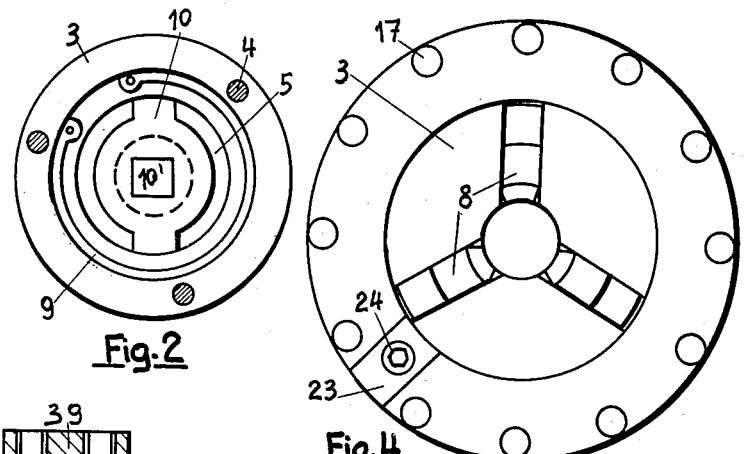
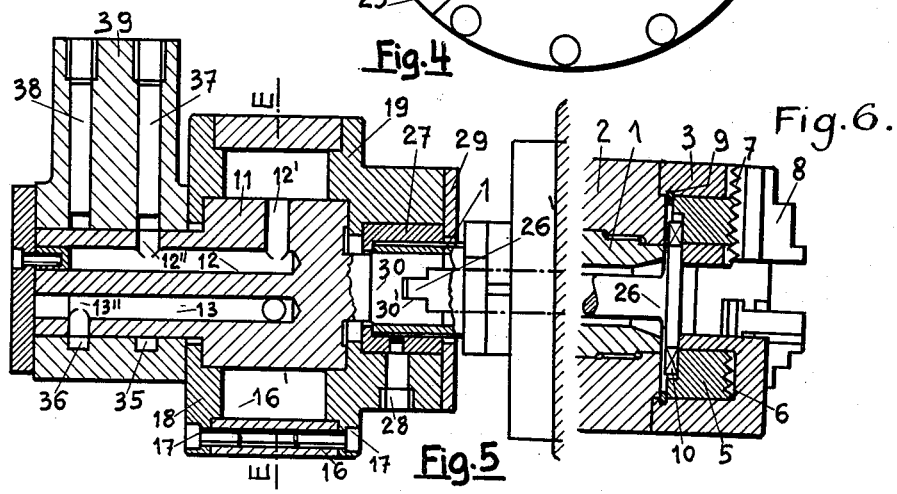
INVENTOR:
HANS KORBER
BY Leon M. Strauss

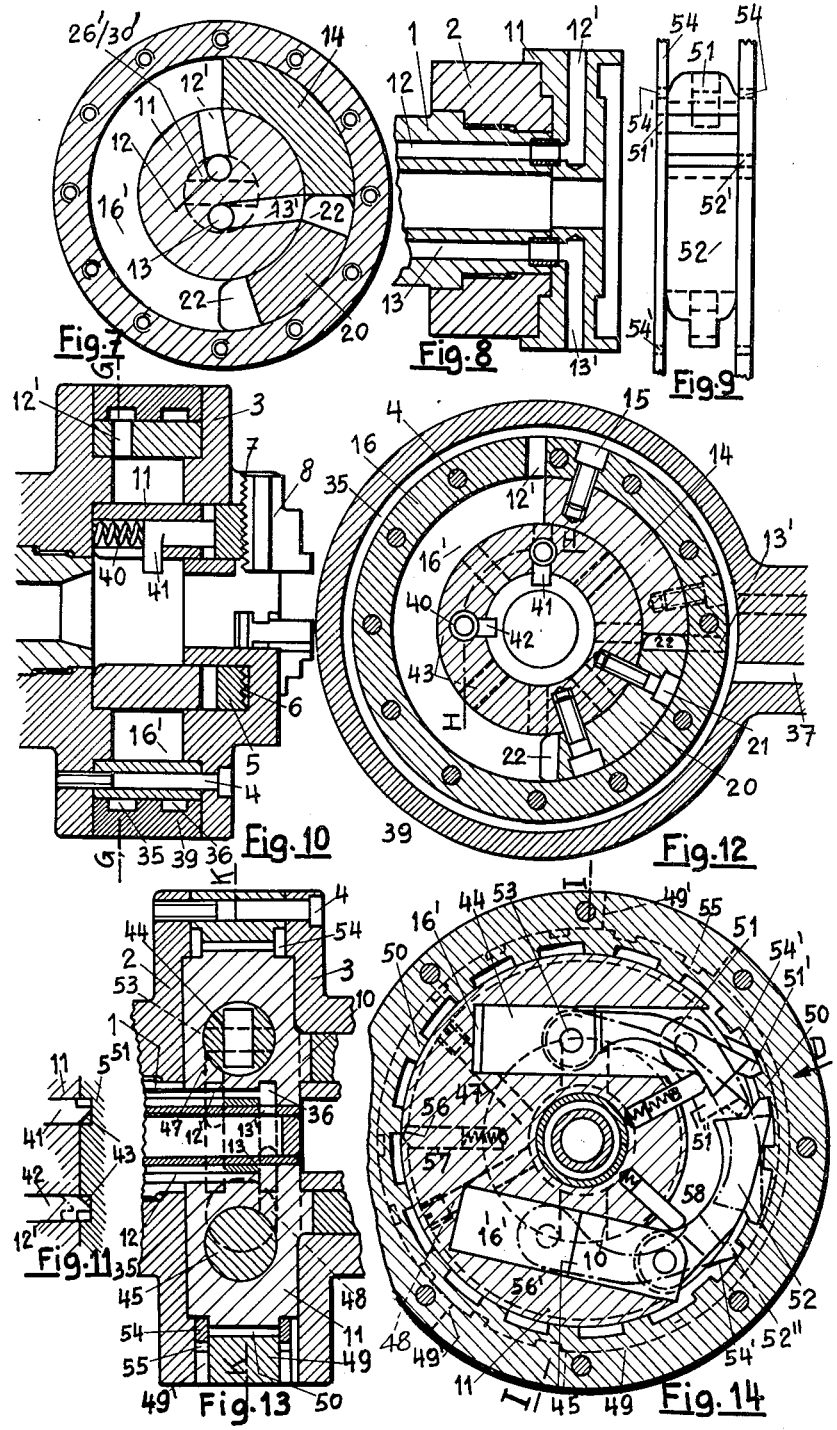

June 19, 1956  H. KORBER  2,751,230
HYDRAULIC CHUCK
Filed Nov. 18, 1950  4 Sheets-Sheet 3

INVENTOR.
HANS KORBER

June 19, 1956   H. KORBER   2,751,230
HYDRAULIC CHUCK
Filed Nov. 18, 1950   4 Sheets-Sheet 4
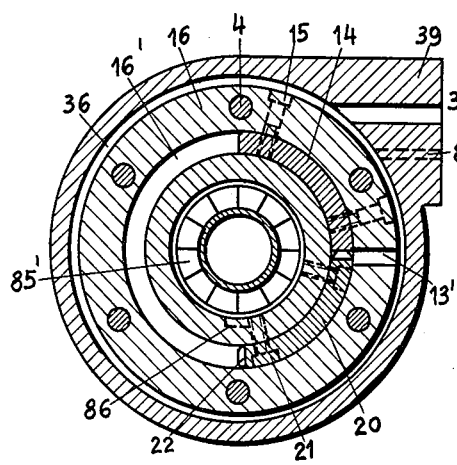
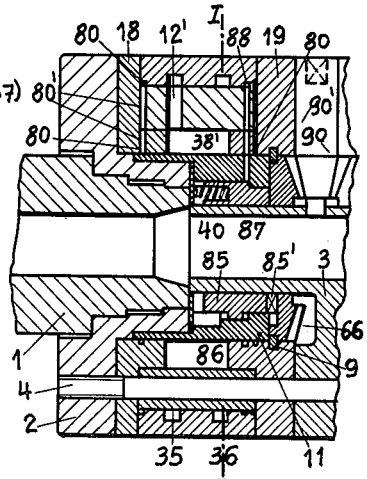
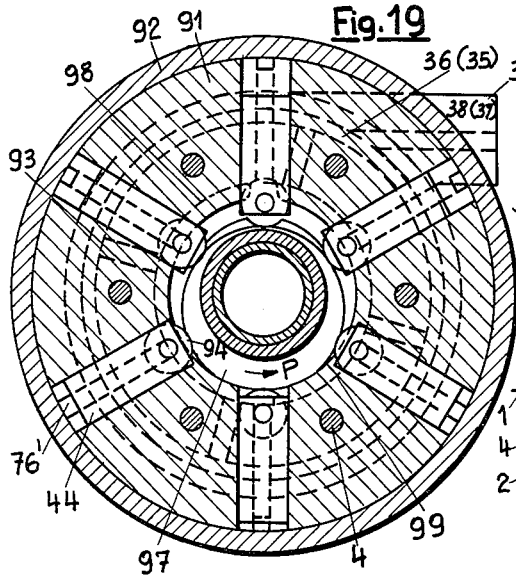
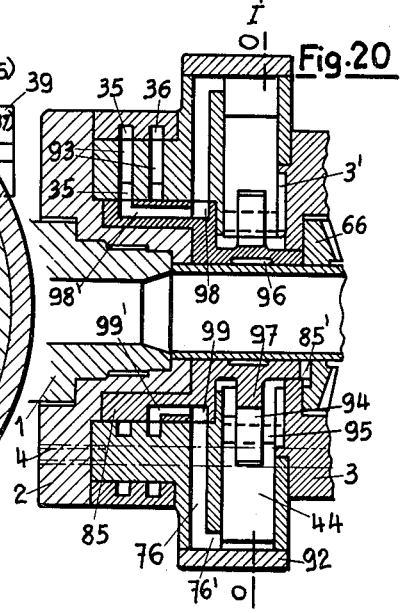
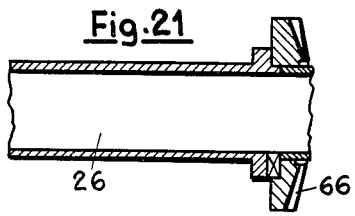
INVENTOR:
HANS KORBER

United States Patent Office 2,751,230
Patented June 19, 1956

2,751,230
HYDRAULIC CHUCK

Hans Korber, Fribourg, Switzerland

Application November 18, 1950, Serial No. 196,533

Claims priority, application Switzerland November 21, 1949

7 Claims. (Cl. 279—114)

This invention relates to chuck structures. Chucks are known in which the clamping jaws are moved by helical-toothed segmental racks which are coupled together, one of the racks being actuated by a hand-operated screw.

Clamping or releasing of the clamping jaws is normally effected by hand. Experience has shown that this work is time consuming and involves effort which increases as the machining times of the parts decrease. On each occasion the spindle must be stopped, after which it is frequently necessary to turn it through a part-revolution so as to bring the key opening into an accessible position; then follow insertion of the key, unchucking of the work, replacement of the workpiece, chucking, and restarting of the spindle. It is however required that delicate parts or tools should always be clamped under the same tension, which is very difficult to achieve by hand, partly because of the effects of fatigue. For the aforementioned reasons, spring collets or mandrels are used for the work to be repeatedly done. Devices of this kind generally exhibit the disadvantage that the diameter ranges always call for chucking elements, with respect to which the workpieces must vary only very slightly in diameter.

The purpose of the invention is to eliminate these drawbacks and principally to replace spring collets and mandrels. Changing over from one kind of workpiece to another is possible with one and the same chuck. Work that is particularly suitable for the purpose may even be chucked and unchucked during rotation of the spindle. Even substantially differing workpiece diameters can be chucked with certainty and under a constant pressure. The advantages of a chuck, spring collets and mandrels are combined in one and the same tool.

The invention relates to a chuck with clamping jaws moved radially by a scroll plate or by segmental racks coupled together, and consists in the fact that a medium or fluid supplied under regulatable pressure moves one or a plurality of pistons arranged in a plane perpendicular to the longitudinal axis of the spindle and that said pistons move the scroll plate or the segmental racks directly or through interposed members in both operating directions, and that accordingly either specially equipped or standard commercial chucks can be operated in such a way as to close or leave open a passage.

The drawings illustrate a few embodiments of the invention.

Fig. 1 is a section through a chuck taken along the line A—A in Fig. 3,

Fig. 2 is an interior view of the detached chuck,

Fig. 3 is a section taken along the line B—B in Fig. 1,

Fig. 4 is an elevation in the direction of the arrow C in Fig. 1,

Fig. 5 is a section through the drive of a standard commercial chuck,

Fig. 6 is a section through the standard commercial chuck of Fig. 5,

Fig. 7 is a section taken along the line E—E in Fig. 5,

Figure 16:
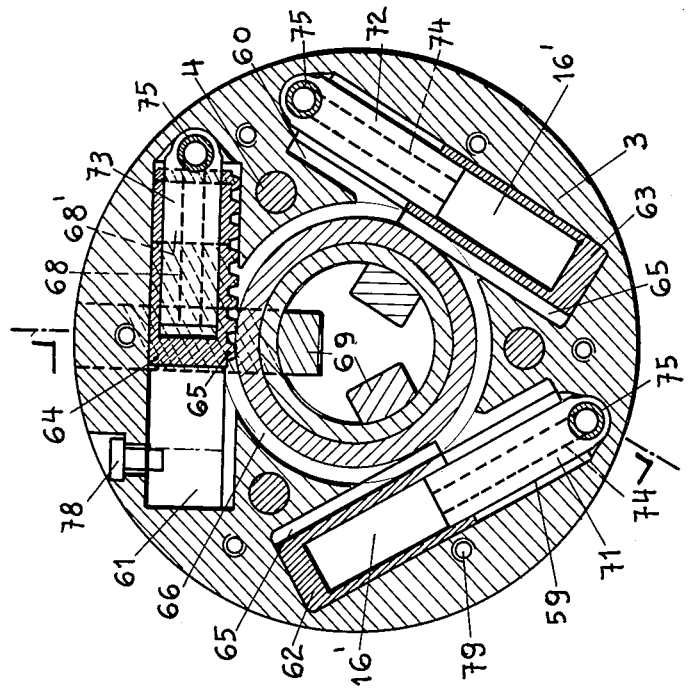
Figure 15:
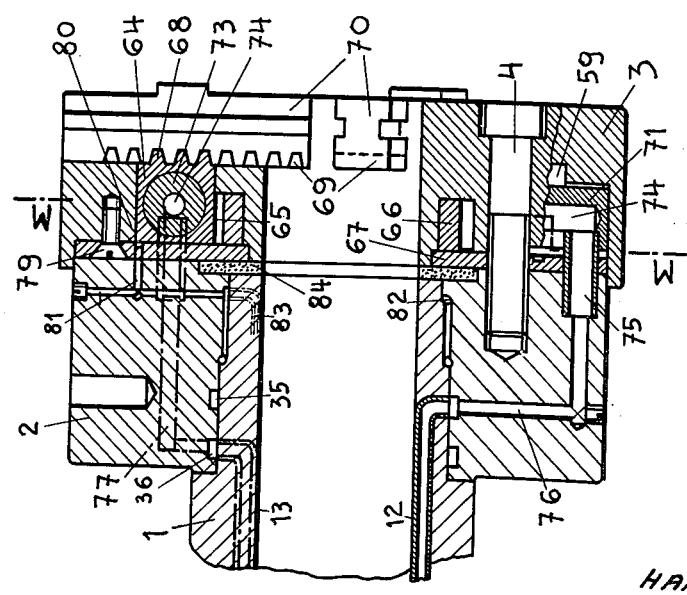

Fig. 8 is a section corresponding to Fig. 1 with fragmentary representation of another method of feeding the medium, Fig. 9 is a fragmentary view in the direction of the arrow D in Fig. 14, but with the casing removed, Fig. 10 is a section taken along the line F—F in Fig. 12, through a specially equipped chuck embodying the invention, Fig. 11 is a fragmentary section taken along the line H—H in Fig. 12, Fig. 12 is a fragmentary section taken along the line G—G in Fig. 10, Fig. 13 is a section, taken along the line I—I in Fig. 14, of a further embodiment of a specially equipped chuck, Fig. 14 is a section taken along the line K—K in Fig. 13, Fig. 15 is a section taken along the line L—L in Fig. 16 of a further specially equipped chuck, Fig. 16 is a section taken along the line M—M in Fig. 15, Fig. 17 is a section through the chuck, taken along the line N—N in Fig. 18, Fig. 18 is a longitudinal section through the chuck, Fig. 19 is a section taken along the line O—O in Fig. 20, Fig. 20 is a longitudinal section, and Fig. 21 is a section through a hollow driver shaft.

In Figs. 1 to 16, 1 is the spindle of a machine tool. Carried on the spindle 1, as a means of mounting the chuck, is the flange 2. The casing 3 is secured to the flange 2 by screws 4. The scroll plate 5 (Figs. 1–13) is provided with the known type of scroll 6 which engages with the teeth 7 of the clamping jaws 8. The scroll plate 5 is retained in the casing 3 by the expanding ring 9 (Figs. 1, 2 and 6). 10 is a driver having at its centre an opening 10', Figs. 1 and 2. In Fig. 6 ring 9 is integral with the driver shaft 26. The cylinder shaft 11 (Figs. 1, 3 and 8) is centered on the flange 2 and held jointly with the casing 3 by said screws 4. In the embodiment of Figs. 1 to 3, the tubes 12 and 13, sealed against each other, are welded in the center of the cylinder shaft 11. They communicate with the ducts 12' and 13', respectively, of the cylinder shaft 11. In the embodiment of Fig. 8 the tubes 12 and 13 are replaced by corresponding bores 12 and 13, respectively, in the spindle 1. A segmental seal 14 is secured by screws 15 to the cylinder shaft 11 (Fig. 3).

The cylinder chamber 16' is formed about the cylinder shaft 11 by the cylinder ring 16 and cylinder walls 18 and 19 (Figs. 1, 3, 5 and 8), the aforesaid parts being connected together by screws 17. In the embodiment of Figs. 11 and 12 the cylinder chamber 16' is defined by the flange 2 and the casing 3 with cylinder ring 16 and cylinder shaft 11. The cylinder chamber proper 16' in which the segmental piston 20 moves is formed by the segmental seal 14. The segmented piston 20 is secured by screws 21 to the cylinder ring 16 and has at its ends recesses 22 so that the ducts 12' and 13' are not sealed off when the segmental piston 20 reaches the ends of its travel.

In the embodiment of Figs. 1 to 4 a driver 23, secured by a screw 24 to the cylinder wall 19, engages through the slot 3' in the casing with the slots 5' of the scroll plate 5. The recess 25 serves, for instance, for compensation of any imbalance caused by the weight of the segmental piston 20.

In the embodiment of Figs. 5 to 7, the cylinder 11—16—18—19 is mounted at one end of the spindle 1, and is held by the spindle nut 27 by means of the screw 28 and the cover-plate 29. At the working end the spindle 1 carries the flange 2 with the casing 3. The shaft 26 of the driver 10 is provided with a claw 26' which engages in the slot 30' of the extension 30 of the cylinder shaft 11. The extension 30 of the latter contains the bores 12 and 13 which open at one end into the ducts 12' and 13', respectively, and at the other end are sealed by plugs 34 secured to the coverplate 32 by screws 33 and open through communication ports 12'' and 13'', respectively, into the annular ducts 35 and 36. Conducting channels 37 and 38 are provided in the connecting lever 39, which is retained on the extension 31 by the coverplate 32.

In the embodiment of Figs. 10 to 12 the connecting lever 39, containing the annular ducts 35 and 36 and the conducting channels 37 and 38, is mounted on the cylinder ring 16 and is held laterally by the flange 2 and the casing 3. Driver pawls 41 and 42, loaded by springs 40, are guided in the cylinder shaft 11 and engage in driver slots 43 of the scroll plate 5. The ducts 12' and 13' are bored in the cylinder ring 16.

In Figs. 13, 14 and 9 an embodiment is illustrated in which cylindrical pistons 44 and 45 are used instead of the segmental piston 20. The cylinder chambers 16' are formed by bores in the cylinder shaft 11. By way of example, the tubes 12 and 13, sealed off against each other, are rotatably mounted in the cylinder shaft 11, and the ducts 12' and 13' communicate with the annular ducts 35 and 36, respectively, let into the cylinder shaft 11. The annular ducts 35 and 36 communicate with the cylinder chambers 16' through the bores 47 and 48, respectively. Rigidly connected by screws 4 to the flange 2 and the casing 3 is the locking ring 49, which is provided with stop lugs 50 and surrounds the cylinder shaft 11. Articulated to the pistons 44 and 45 are pawls 51 and 52, respectively, which are held by pivots 53. Each pawl 51 and 52 has an extension 51' and 52', respectively, which extensions engage above the locking bolts 54, the latter being held by the flange 2 and the casing 3 and centered on the cylinder shaft 11. The locking bolts 54 each have two oblique planes 54', recesses 55 and notches 56, 56', in which latter the spring-loaded plungers 57 engage. The plungers 57, and also the spring-loaded plungers 58 for holding the pawls 51 and 52, are let into the cylinder shaft 11. The cylinder shaft 11 is provided with two drivers 10 which engage in the scroll plate 5. The recesses 55 of the locking bolts 54 can be reached by a key, not shown, through openings 49' in the locking ring 49.

A further embodiment of the invention is illustrated in Figs. 15 and 16. The tubes 12 and 13 are let into the spindle 1 so that the bore of the spindle 1 is left unobstructed. Said tubes open at the surface of the spindle 1 opposite the annular ducts 35 and 36 respectively machined in the flange 2. The casing 3 is centered on the flange 2 and secured by screws 4. Guided in corresponding recesses 59, 60 and 61 in the casing 3 are the segmental racks 62, 63 and 64 whose teeth 65 engage with the gearwheel 66. The latter is rotatably mounted in the casing 3 and held by coverplate 67. The teeth 68 of the segmental racks 62 to 64 engage with the helical toothing 69 of the corresponding clamping-jaw slides 70, of known design. The clamping jaw slides 70 are guided in the casing 3, are displaceable in a radial direction, and carry in the known manner the clamping-jaws, which are attached to them by screws (not shown in the drawing). The cylinder chambers 16' are formed by bores in the segmental racks 62 to 64, into which the pistons 71, 72 and 73 respectively penetrate. The bore 74 in the pistons 71 to 73 connects the cylinder chamber 16' to the connecting member 75 and thereby to the ducts in the flange 2, as follows: piston 71—connecting member 75—duct 76—annular duct 35; piston 72—connecting member 75—duct like 76—annular duct 35; piston 73—connecting member 75—duct 77—annular duct 36.

The travel of the segmental rack 64 is limited by, for example, the stop screw 78. The pistons 71 to 73 are supported at the end opposite to the cylinder chamber 16' in the recesses 59, 60 and 61 of the casing 3. The coverplate 67 secured by screws 79 to the casing 3 retains the segmental racks 62, 63 and 64 in the casing 3. It is provided with an annular channel 80 which is connected through port 81 to annular duct 82 and is accordingly in communication with the discharge tube 83. The latter is likewise let into the spindle 1. 84 is an elastic seal.

The manner in which the embodiments described in relation to Figs. 1 to 16 operate will now be explained.

*Embodiment illustrated by Figs. 1 to 4.*—If desired, a standard commercial chuck may be utilized through the expedient of machining the slot 3' in the casing 3 and providing the scroll plate 5 with slots 5'. From a pump (not shown in the drawing) the medium, for instance compressed air, oil or the like, is fed via a control valve of known type and, for instance, through a connecting lever 39 (as shown in Figs. 5 and 7), and through the tube 12, whence it passes through the duct 12' into the cylinder chamber 16'. The segmental piston 20 is displaced until it reaches, for example, the terminal position 20 shown in Fig. 3 of the drawing. The cylinder ring 16 and the cylinder walls 18 and 19 turn with the segmental piston 20, the driver 23, which engages in a slot 5' of the scroll plate 5, at the same time rotating the latter with the result that the scroll 6 forces the teeth 7 in outward direction, thereby opening the jaws 8. The segmental seal 14 during this operation prevents the medium forced into the cylinder chamber 16' from reaching the duct 13'. The medium displaced by the rotation of the segmental piston 20 escapes through the duct 13' and the tube 13 back to the control valve and pump.

If, through reversal of the control valve, the medium is forced through tube 13 and duct 13' into the cylinder chamber 16', the segmental piston 20 rotates in a clockwise direction and the dislodged medium escapes through duct 12', tube 12 and the control valve back to the pump. According to the pitch of the scroll 6 of the scroll plate 5, the jaws 8 are now moved, for example towards the middle of the casing 3. If a piece of work is held between the chuck jaws, the segmental piston 20 will move until the jaws 8 are firmly clamped, for example in position 20'. The desired clamping pressure can be set at a predetermined value by means of known reducing valves or some other pressure-regulating device. The reaction of the medium is transmitted via the segmental seal 14 to the cylinder shaft 11, which is screwed to the casing 3 and the flange 2 by means of screws 4.

The described relative movement of the segmental piston 20 in relation to the segmental seal 14, produced in both directions by the compressed medium, enables workpieces or the like to be clamped from the inside or from the outside, and can take place, without causing any disturbance, even while the spindle 1 is rotating.

As will be seen from Fig. 3 of the drawing and from the foregoing description, the segmental piston 20 can revolve through, for example, a maximum of 180° about the cylinder shaft 11, which, according to the pitch of the scroll 6, will correspond to a limited travel of the chucking jaws 8. Should it be desired to open or close the jaws 8 still further, as for instance when changing over to a different workpiece, the screw 24 is loosened and the driver 23 removed. By means of a key (not shown in the drawing) inserted in the opening 10', the driver 10 is turned by hand, and with it the scroll plate 5. Operation may also be effected, however, with the aid of the medium, the driver 23 being left in engagement with the scroll plate 5 only in a desired direction of rotation. On the return movement the connection is eliminated and the scroll plate remains stationary. In this way the scroll plate 5 can be arranged to turn, for example, 180° further at each backward- and forward-motion of the segmental piston until the desired opening of the chucking jaws 8 is reached.

*Embodiment illustrated by Figs. 5 to 7.*—A standard commercial chuck may be employed in which the scroll plate 5 is further provided with recesses for the driver 10, Fig. 6. The drive elements for actuating the chuck are fitted at the opposite end of the spindle 1. The medium is supplied in the same way as described in connection with the preceding embodiment, but the segmental piston 20 is screwed to the cylinder shaft 11 and the segmental seal 14 to the cylinder ring 16, as will be seen from Fig. 12. The cylinder shaft 11 is mounted rotatably in the spindle 1 and the cylinder ring 16 is secured to the spindle nut 27, by means of the screw 28 and held against rotation. The segmental piston 20 is displaced by the pressure of the medium rotates the scroll plate 5 via the cylinder shaft 11, the driver shaft 26 and the driver 10. Feed and return of the medium are effected through the conducting channels 37, 38 of the non-rotating connecting lever 39 to the annular ducts 35 and 36, respectively. The ducts 12″ and 13″ communicate, in every position of the cylinder shaft 11, with the annular ducts 35 and 36, respectively, and therefore also with the bores 12 and 13 and the ducts 12′ and 13′, respectively. The medium accordingly flows from the pump via the control valve into the ducts in the connecting lever 39, through the cylinder shaft 11 to the cylinder chamber 16′, and back.

Both the embodiments described operatively utilize the bore of the spindle, so that these embodiments are not suitable for bar work.

*Embodiment illustrated by Fig. 8.*—This is an embodiment in which the spindle bore is left unobstructed through the fact that the conducting channels, tubes 12 and 13 in Figs. 1 and 3, are replaced by bores 12 and 13, respectively, in the spindle 1. For the rest this embodiment is identical with that illustrated by Figs. 1 to 4. The opening 10′ for the key is so designed as not in any way to obstruct the bore of the spindle 1.

*Embodiment illustrated by Figs. 10 to 12.*—A chuck equipped especially for the purpose, combined with a connecting lever 39 which embraces the cylinder ring 16, avoids any obstruction of the bore of the spindle 1. When the medium, supplied under pressure, passes through the conducting channel 37 into the annular duct 35, it proceeds through the duct 12′ into the cylinder chamber 16′ and forces the segmental piston 20 into, for example, the end position as shown in Fig. 12. The medium remaining in front of the segmental piston 20 is, during the rotation mentioned, fed from the cylinder chamber 16′ through the duct 13′ to the annular duct 36 and the conducting channel 38, whence it reaches the pump via the control valve. As the segmental seal 14 is secured to the cylinder ring 16 and the latter in turn is held to the flange 2 by screws 4, said cylinder ring cannot perform any movement without the spindle 1. As a result of the fact that the segmental piston 20 is fixed by screws 21 to the cylinder shaft 11, every rotation of the segmental piston 20 is transmitted to said cylinder shaft 11. According to the direction of rotation of the cylinder shaft 11, a driver pawl 41 or 42, by engaging in a driver slot 43, simultaneously rotates the scroll plate 5 in the same direction as said cylinder shaft. Where the jaws 8 are to be moved to another initial position when the work is changed, the corresponding pawl, for example 42, is held in the lifted position 42′ (see Fig. 11). As a result of the previously-described to-and-fro motion of the cylinder shaft 11, the scroll plate 5 is driven only by pawl 41, while when rotation is in the opposite direction the pawl 41 emerges, owing to its oblique face, from the driver slot 43.

*Embodiment illustrated by Figs. 13, 14 and 9.*—The segmental piston is, in this embodiment, replaced by cylindrical pistons 44, 45. If, for example, the medium supplied under pressure is fed through the tube 12, it proceeds through duct 12′, annular duct 35 and bore 47 into the cylinder chamber 16′ of the piston 44. The piston 44 transmits the pressure to the pawl 51, and the latter in turn transmits pressure to the arresting lug 50 of the locking ring 49, which is held by being screwed to the flange 2. Consequently the cylinder shaft 11 rotates in a counterclockwise direction and transmits the rotary movement through driver 10 to the scroll plate 5. During the rotation the cylinder chamber 16′ of the piston 45 decreases in size and the medium is forced out into the tube 13 via the bore 48, the annular duct 36 and the duct 13′. The piston 45 in this process bears against the pawl 52, which is forced against the arresting lugs 50 by the spring-loaded plunger 48. If the medium under pressure is now supplied through the tube 13, the cylinder shaft 11 rotates clockwise, the reaction being absorbed by the piston 45 on the pawl 52 and the locking lug 50.

The continuous rotary motion of the scroll plate 5 necessary for resetting the clamping jaws when changing the work is obtained by lifting a pawl 51 or 52. By way of example, the pawl 51 has been, on rotation of the locking bolt 54, lifted by the oblique plane 54′ and the extension 51′ from the arresting lug 50 and brought into position 51″. If the medium displaces the piston 44 and accordingly the pawl 51, the latter will press on the pawl 52, which now, sliding over the arresting lugs 50, will displace the piston 45 without the cylinder shaft 11 being thereby turned. If the control is operated in the reverse direction, i. e. if the medium is forced into the cylinder chamber 16′ of the piston 45, the latter will force the pawl 52 against an arresting lug 50, displacement of the piston 45 is prevented and the cylinder shaft will rotate in a clockwise direction. Turning the bolt 54 in reverse will restore the pawl 51 to its operative position, under the pressure of the spring-loaded plunger 58. The clamping jaws 8 will be adjusted in the contrary direction when the pawl 52 is brought out of engagement by the respective locking bolt 54, oblique plane 54′ and extension 52′.

*Embodiment illustrated by Figs. 15 and 16.*—A specially constructed chuck, and tubes 12, 13 and 83 recessed in the spindle 1, keep the spindle bore unobstructed. If medium supplied under pressure is conducted through tube 12 it will, via annular duct 35, ducts 76, connecting members 75 and bores 74 of the pistons 71—72, reach the cylinder chambers 16′ of the segmental racks 62 and 63. As the pistons 71 and 72 find a bearing in the casing 3, the segmental racks 62 and 63 will be displaced, thereby rotating gearwheel 66 by means of the teeth 65 and, in addition, by means of teeth 68 which engage with the helical teeth 69 of clamping jaw slides 70, said clamping-jaw slides will be displaced towards the center of the chuck. Since the gearwheel 66 also displaces the segmental slide 64, the corresponding clamping-jaw slide 70 will be moved in the same direction, the medium being forced out of the cylinder chamber 16′ of the segmental rack 64 through the bore 74 in the piston 73 into the duct 77, annular duct 36, and tube 13. By way of example, in the embodiment illustrated two pistons, 71 and 72, are used for closing the clamping-jaw slides 70, while the movement for opening the slides is effected by only one piston 73 and segmental rack 64. A stop-screw 78 limits the travel of the segmental rack 64. If this stop is removed and the medium supplied under pressure fed through tube 13, duct 77 and bore 74 of the cylinder 73, the segmental rack 64 will be moved further, and also, via the gearwheel 66, the segmental racks 62 and 63, in the same direction, until the recess 68′ in the toothing 68 of the segmental racks 62 to 64 releases the clamping-jaw slides 70, so that they can be lifted off. In this embodiment oil is preferably used as the medium. Oil which leaks out through imperfect sealing will lubricate the teeth, and any surplus oil will proceed through the annular channel 80 of the coverplate 67 into the port 81, the annular duct 82, the discharge tube 83 and back to the pump.

Figs. 17 to 21 illustrate further embodiments which will now be discussed.

In Figs. 17 and 18, 1 is the spindle of a machine tool, 2 the flange provided to accommodate the chuck, and 3 the casing of the latter. Gearwheel 66 is in engagement with the bevel gears 90, which are used in the known manner for the direct or indirect displacement of the clamping jaws (not shown).

Cylinder ring 16, with ducts 12' and 13', segmental seal 14, segmental piston 20 and also the cylinder shaft 11, likewise the connecting lever 39 with conducting channels 37 and 38 and annular ducts 35 and 36, are of the same kind and perform the same functions as shown in Figs. 10 and 12 and discussed in reference thereto.

Arranged inside the cylinder shaft 11 is a dog clutch 85 designed as a piston, which clutch is coupled at one side by the key 86 to the cylinder shaft and at the other engages by the dogs 85' with similar dogs 85' of the gearwheel 66. When the cylinder shaft 11 rotates, the dog clutch 85 will be likewise rotated, through the key 86, and in consequence the gearwheel 66 will rotate also, so that the clamping jaws will be moved in the known manner by the bevel gearwheel 90.

If, before the cylinder shaft 11 is rotated, the medium supplied under pressure is, by suitable control, conducted through the port 81, the annular ducts 88 and 88' and the bores 89 into the compression chamber 87, the dog clutch 85 will be shifted in opposition to the springs 40; the dogs 85' will be thrown out of engagement with the gearwheel 66, so that when the cylinder shaft 11 subsequently turns the gearwheel will remain stationary. If, before the cylinder shaft 11 is rotated in the opposite direction, the pressure of the medium on the dog clutch 85 is discontinued, the springs 40 will force the dog clutch 85 back into its position of engagement with the gearwheel 66, and the rotating cylinder shaft 11 will accordingly also rotate the gearwheel 66, so that the clamping jaws, Fig. 10, will be displaced as described.

Through this alternating operation the clamping jaws will be moved in the same direction until the desired clamping aperture has been obtained.

The expanding ring 9 holds the cylinder shaft 11 and the gearwheel 66 in position. The casing 3, the cylinder walls 18 and 19, and the cylinder ring 16, are secured to the flange 2 by the screws 4. The annular channels 80, intercommunicating via slots 80', serve the purpose of leading away any quantity of the medium which may leak out via a port similar to port 81.

In the embodiment illustrated by Figs. 19 and 20, 1 may be the spindle, 2 the flange and 3 the casing, respectively, of a standard chuck. Between the casing 3 and the flange 2 the cylinder casing 91, likewise secured by the screws 4, is arranged. Each of the pistons 44 is provided with a roller 94 attached by means of an axle 95. The roller 94 is guided in its correct position by engagement of the axle 95 in a slot 3' in the casing 3. The dog clutch 85 is coupled, by means of the dogs 85', with, for instance, the gearwheel 66, and serves to transmit the rotary movement in the known manner to the actuating mechanism of the clamping jaws (not shown). The dog clutch is provided with a cam plate 97 and may be mounted on the casing 3, on the central plane of said cam plate 97, by means of a needle bearing 96.

If a medium under pressure is supplied through the conducting channel 37, and the annular duct 35 of the connecting lever 39, it will proceed through the bore 93 into the annular duct 35 of the cylinder casing 91 and through the bore 93' into the conducting channel 98, which embraces approximately half the circumference of the dog clutch 85. As a result, the medium will be distributed among those pistons 44 whose respective ducts 76 open over the conducting channel 98.

The opening 76' connects the duct 76 to the cylinder chamber of the piston 44, which is sealed towards the exterior by the annular coverplate 92. The pistons 44 are forced radially towards the center of the chuck, and the bearing pressure exerted by the rollers 94 moves the cam plate 97, and consequently the dog clutch 85, in the direction indicated by the arrow P (see Fig. 19). The oppositely disposed pistons are moved outwardly, and the medium is discharged through the opening 76', the duct 76, conducting channel 99, bore 99' annular ducts 36 and conducting channel 38. Since the conducting channels 98 and 99 are machined into the dog clutch 85, they rotate therewith and serve the purpose of distributors.

Where the medium is supplied through conducting channel 38 and annular ducts 36, the movement of the dog clutch 85 takes place in the opposite direction. This rotation of dog clutch 85 continues until the supply of the medium is interrupted.

It will be readily appreciated that in the described embodiments also, which are similar to the embodiments discussed in relation to Figs. 5 and 6, the driving section can be arranged on one end of the spindle and the chuck separately at the other end of the spindle. In this case it is preferable for the driver shaft 26, Fig. 21, which engages for example with the gearwheel 66, to be hollow.

Having thus described the invention, what is claimed as new and desired to be secured by Letters Patent, is:

1. A chuck with clamping jaws movable radially by means of a scroll plate; comprising a spindle, a plurality of ducts passing through said spindle for admission of a pressure medium, at least one reciprocable piston element arranged in a plane perpendicular to the longitudinal axis of said spindle and actuatable by said pressure medium, coupling means intermediate said reciprocable piston element and said scroll plate and operatively connectable with the latter to selectively move said scroll plate in a given direction and in a direction opposite thereto for displacing said jaws toward and away from each other, supporting means adapted for rotation simultaneously with said spindle, outer jacket means spaced from said supporting means and defining therebetween a substantially annular chamber, said reciprocable piston element being operatively connected to said jacket means and operatively retained within said chamber, said supporting means being provided with a pair of divergent radial passageways each communicating at one end with a respective duct and each communicating at its opposite end with said chamber, and segmental sealing means secured to said supporting means and disposed within said chamber extending through a predetermined arc between said opposite ends of said pair of passageways, thereby defining a fluid-tight segmental annular working chamber having substantially an angular magnitude of 360 degress less said predetermined arc.

2. A chuck according to claim 1, wherein said coupling means is operatively arranged for rotation with said reciprocable piston element.

3. A chuck according to claim 1, wherein said coupling means comprises at least one driver element engageable with said scroll plate.

4. A chuck according to claim 1, wherein a connecting lever is mounted on said outer jacket means, and canal means for conveying said pressure medium therethrough.

5. A chuck according to claim 1, wherein said piston element is provided with a pawl pivoted thereto.

6. A chuck according to claim 1, said coupling means including at least one piston member actuatable intermittently by said pressure medium.

7. A chuck according to claim 1, said coupling means comprising at least one driver element engageable with said scroll plate.

References Cited in the file of this patent

UNITED STATES PATENTS

| | | |
|---|---|---|
| 1,364,783 | Morgan | Jan. 4, 1921 |
| 1,469,360 | Cullen | Oct. 2, 1923 |
| 1,608,462 | Cutler | Nov. 23, 1926 |
| 1,851,723 | Neidow | Mar. 29, 1932 |
| 2,016,652 | Poole | Oct. 8, 1935 |
| 2,191,371 | Church | Feb. 20, 1940 |
| 2,423,244 | Lovely | July 1, 1947 |
| 2,474,771 | Amstutz et al. | June 28, 1949 |